United States Patent Office 3,441,525
Patented Apr. 29, 1969

3,441,525
PROCESS FOR THE PRODUCTION OF AQUEOUS DISPERSIONS OF RUBBER CONTAINING LIGHT-COLORED REINFORCED FILLERS AND RUBBERS RESULTING THEREFROM
Rudolf Kern, Neustadt-Weinstrasse, Gregor Groppenbacher, Schwetzingen, Bavaria, and Hans Scheurer, Heidelberg-Schlierbach, Germany, assignors to Rhein-Chemie G.m.b.H., Mannheim-Almenhof, Germany
No Drawing. Continuation-in-part of application Ser. No. 241,525, Dec. 3, 1962. This application June 12, 1967, Ser. No. 645,494
Int. Cl. C08c 9/16; C08j 1/46
U.S. Cl. 260—4       15 Claims

ABSTRACT OF THE DISCLOSURE

Aqueous dispersions or latices of rubbery polymers, which are reinforced with light-colored reinforcing pigments and which are suitable for direct production of rubber articles of high tear strength without mastication, are made by incorporation under shearing force into the solid rubbery polymer or mixture of such polymer with a polymer of a vinylidene compound, at least 10% of a light-colored reinforcing pigment, a wetting agent which is selected from anionic and nonionic surface-active agents, an alkaline substance, and a suitable water-swellable to water-soluble high polymer, such as polyacrylic acid, salts and amides thereof, having a hydrocarbon backbone with carboxyl groups or salts or amides thereof depending therefrom, and adding water to the mixture while generally free of objectionable volatile solvents and tackifiers until a dispersion of said high polymer mixture in a continuous phase of aqueous liquid is formed.

---

This application is a continuation-in-part of my copending application Ser. No. 241,525, filed Dec. 3, 1962. The invention relates to a novel method of producing aqueous dispersions of rubbers containing light-colored reinforcing fillers, which dispersions will upon drying and suitable treatment form a reinforced rubber article. It also relates to the rubber products prepared from these dispersions.

Articles formed from unpigmented compounds of most synthetic rubbers, especially those of the generally used hydrocarbon type, have extremely low strengths. When carbon black is masticated into such rubbers their strengths are greatly increased. Also satisfactory synthetic rubber vulcanizates have been obtained when synthetic rubber is mixed in a mixing roll mill or in an internal mixer with light-colored active filler substances, also known as reinforcing or strengthening fillers or pigments, as well as with the usual vulcanizing agents and other rubber additives to produce a homogeneous and practically water-free mixture which is then shaped and vulcanized. Similarly, the good rubber technology characteristics of similarly prepared vulcanizates made from natural rubber mixtures that contain such fillers are known and are made use of in many technical and industrial fields. Aqueous dispersions of rubber latices may be compounded with curing agents, softeners, pigments and the like. Such compounded latices have been widely used to directly produce, upon drying and curing in shaped form, shaped articles without a mastication step. A serious drawback of such procedure in the past has been the fact that it has been impossible to obtain, in the rubber article, the reinforcing effects of reinforcing pigments such as carbon blacks, very fine silica and the like, such pigments incorporated into latices being primarily merely diluents. E. W. Madge in Naunton "The Applied Science of Rubber," published by Edward Arnold (Publishers) Ltd. 1961, recognizes this fact and states on page 32, that it has heretofore been impossible to strengthen natural latex rubber with light-colored active filler substances in the same way that this can be done for dry rubber. However, natural rubber as deposited from its latex and before it has been subjected to any mastication has high ultimate strength but only at high elongations, i.e. the modulus of unreinforced natural rubber is low. This has limited the direct use of latices in preparation of the ultimately desired articles. Even though mastication greatly degrades such rubber, most rubber articles are made by a process wherein pigments are incorporated into the rubber by mastication. This requires the manufacturer of the reinforced articles to have heavy and extremely expensive high power-consuming machinery.

Most synthetic rubbers haxe extremely low strengths in their unreinforced or natural state so they have had very limited use. No one to date has even described any attempt to fill synthetic rubber latex with light-colored active filler substances.

Numerous attempts have also been made to mix rubber latices, particularly synthetic rubber latices, with latices of thermoplastic polymerizates to provide mixtures from which could be made shaped articles, the properties of which corresponded to those of shaped or molded articles made from strengthened, i.e. reinforced, and practically water-free mixtures. However, such latex mixtures could not be strengthened by filler substances nor did they yield useful articles in a crosslinked or uncrosslinked state.

In the event that coherent films became formed at all, they were non-homogeneous and had very poor physical characteristics. The chief reason for this was that an intimate mixing of the rubber particles in the synthetic rubber latex with the particles of the thermoplasic latex and the filler suspension could not be obtained. However, such an intimate mixing together is absolutely necessary for the production of homogeneous strengthened vulcanizates because only through such an intimate mixing is the desired strengthening effect obtained, and at the same time precipitation of the filler substance from the dispersion is prevented. It is recognized that natural rubber has been dispersed in aqueous liquids in an attempt to produce artificial latices. However, the rubber of the latices has in each instance been so degraded and the materials incorporated have caused such disadvantages that commercial use of the artificial dispersions was very limited. The process heretofore proposed may be grouped into the solvent and non-solvent types. In the non-solvent type a hydrophilic material such as clay, ammoniated casein etc. was milled into the rubber in substantial volume to act as a dispenser and water slowly added until the water-in-oil dispersion broke to the oil-in-water type. Non-reinforcing pigments could be present in the rubber but substantial amounts of active reinforcing pigments caused difficulty by resisting expansion by the water.

However the vulcanizates produced from these aqueous mixtures through shaping, removing water, and vulcanizing, did not display good technical characteristics. Films produced from such dispersions had for example very little resistance to tearing, and showed great sensitivity to water.

In the solvent type of process rubber containing inactive fillers were dispersed after the rubber mix was swollen by solvent. This process was however uneconomical, because of the use of the inorganic solvent, and it moreover required many precautions and protective measures for the purpose of preventing annoyance to and impairment of the health of the operating personnel.

In addition to this, the films or other shaped objects or their vulcanizates had only very low rubber-technology values, which excluded their use for the production of high-grade articles.

One of the objects of this invention is to provide a novel method for producing vulcanizates reinforced with light-colored filler substances.

Another object is to provide such a method wherein the mixture of ingredients is accomplished in dispersion, but the product is not inferior in quality to vulcanizates produced from dry rubber mixtures.

Another object is to provide stable aqueous dispersions in which the filler substances do not tend to precipitate and which permit the production of high-grade vulcanizates in accordance with the usual methods for the processing of latex.

Still another object is to provide vulcanizates which are superior in their physical values and characteristics in use to rubber products obtained from latex.

A further object of this invention is to provide a method of converting homogeneous natural or synthetic rubber mixtures containing light-colored active filler substances, wetting agents, substances having an alkaline action, certain protective colloids and the like into stable aqueous dispersions in which the filler substance does not precipitate.

A further object of this invention is to provide a method for making rubber vulcanizates reinforced with light-colored filler substances, said method involving the preparation of stable latex dispersions in which natural rubber, synthetic rubber and thermoplasts in any combination are mixed with the filler, wetting agents, substances having an alkaline action, certain protective colloids and the like.

Another object is to provide by such a method, reinforced vulcanizates which are not inferior in their rubber-technology characteristics to those vulcanizates made from corresponding practically water-free initial mixtures.

The methods of this invention and the products resulting therefrom satisfy these objects as well as others which are apparent from the following description.

This invention involves a process for the production of aqueous rubber dispersions comprising subjecting to shearing forces a homogeneous mixture comprising rubber, light-colored active filler substances, wetting mediums, substances having an alkaline action and certain polyacrylic compounds and simultaneously adding water to said mixture until a dispersion of the oil-in-water type is formed. The polyacrylic compounds include water-soluble and water absorbent salts of polyacrylic acid and water-soluble and water absorbent polyacryl amides. While the initial mixture is generally practically water-free, some water may be present as a discontinuous phase.

The dispersions in accordance with the present invention are produced as follows:

A rubber mixture based on natural rubber or synthetic rubber or some combination thereof and having mixed therein light-colored active filler substances is produced in the known manner through the action of strong shearing forces as produced in a mixing rolling mill or an internal mixer as used in the rubber industry. It is also possible to incorporate into this rubber mixture thermoplasts as well as the usual auxiliary rubber mediums, such as the mediums for protection against aging, the mediums for protection against light, softeners and so forth. Through the further action of strong shearing forces there are also distributed uniformly through this rubber mixture wetting mediums, substances having an alkaline action, as well as certain protective colloids, and on occasion also vulcanization chemicals, and the entire batch is thoroughly worked until a completely homogeneous mixture is produced. For practical reasons it is advantageous to add the constituents of the rubber mixture in the sequence given here; however it is not of itself necessary to maintain this sequence.

This homogeneous mixture, while being further acted on by shearing forces, preferably in an internal mixer, such as a worm-type mixer, has water gradually added to it in small portions. The water hereby becomes absorbed by the mixture, whereby a dispersion of the water-in-oil type is formed first. With further gradual addition of water in small portions, a phase reversal finally occurs, and a dispersion of the oil-in-water type is formed. From this moment onward, the mixture rapidly becomes increasingly soft, and finally fluid. From here onward water can be added more rapidly and in greater portions.

The resultant dispersion is extremely fine, and contains 90% of particles having a diameter of up to 1.5 microns, while only 10% of the particles have diameters of 1.5 to 3 microns. The particles of this dispersion contain the light-colored active filler substance and the other constituents in a completely homogeneous mixture with the rubber. These dispersions are stable against temperature variations and against mechanical influences, and can by adding water be diluted as required, without coagulation occurring thereby.

In the production of the dispersions of the invention it has proved to be advantageous to work all the vulcanization chemicals, with the exception of the sulfur, into the practically water-free mixture of polymers, light-colored active filler substances, rubber auxiliary mediums and dispersion mediums. Separately and independently of this, the sulfur is by suitable means converted into an aqueous suspension, for example by grinding it with water and wetting medium in a ball-type mill, or by precipitating it in an aqueous phase in the presence of protective colloids. This aqueous suspension of sulfur, for example, so-called colloidal sulfur, is mixed into the other prepared aqueous dispersion of rubber, that contains all the other constituents, this being done advantageously shortly before use. By this measure of keeping the sulfur suspension separate, a premature vulcanizing action of the sulfur on the rubber of the aqueous dispersion is avoided. In this way the stability of the rubber dispersion in storage, particularly at a high temperature, is improved.

Moreover, in some cases it can be advantageous not to work any of the vulcanization chemicals, including the sulfur, into the dry mixture of the chief constituents of the rubber mixture and to disperse them together with these constituents in water, but to suspend the vulcanization chemicals and the sulfur together in water in a separate operation. For this purpose the vulcanization chemicals are, for example, thoroughly milled for about 48 hours in a ball-type mill with the same amount of water and 2% of wetting medium, relative to the dry weight. The resultant aqueous suspension of the vulcanization chemicals is mixed into the other aqueous rubber dispersion which has been prepared shortly before the final processing for the reasons given above. The production of this aqueous suspension of the vulcanization chemicals is not a subject of the present invention.

The rubber employed in the mixtures dispersed by the method of this invention can be natural rubber or synthetic rubber or a mixture thereof. As synthetic rubber it is possible to use all ordinary types, such for example as polymerizates made from conjugated dienes such as butadiene-(1,3), isoprene, 2,3-dimethylbutadiene-(1,3) and other butadiene-(1,3) hydrocarbons, chloroprene, cyanbutadiene-(1,3), and so forth, as well as mixed polymerizates of these conjugated dienes with one another or with other unsaturated compounds, miscible with them, such as styrene, chlorstyrene, isobutylene, vinyl pyridine, acrylic acid nitrile, methacrylic acid nitrile, acrylic and methacrylic acid, acrylic acid ester and methacrylic acid ester, furthermore 1,4-cis polymerizates of butadiene or isoprene, mixed polymers of ethylene and propylene, polyethylene sulfochlorides, polyalkylene polysulfides, or mixtures of the aforesaid substances. It is also possible to use regenerates from synthetic-rubber vulcanizates or natural rubber vulcanizates.

Pigments have long been classified by rubber compounders as inert, nonreinforcing, semi-reinforcing and as reinforcing. Active filler substances or reinforcing pigments or reinforcing filler sustances in the sense of the present invention are to be understood to designate those light-colored synthetic filler substances that when added to the extent of 25% by volume to natural rubber gum stocks, so as to form mixtures in which the designated filler substance is the only reinforcing pigment,[1] effect an increase in tensile strength of at least approximately 10 kilograms per square centimeter. These active filler substances or reinforcing pigments are, without exception, produced by synthetic methods. They are not of mineral origin.

Kluckow in the publication "Die Praxis des Gummichemikers," Stuttgart, 1954, pages 116–117, points out that the active synthetic calcium silicates increase the strength of natural rubber gum stocks 25 to 40 kilograms per square centimeter; whereas, active or reinforcing aluminum silicates and alumina gels increase the strength 50 to 75 kilograms per square centimeter and active silicic acids increase strength 75 to 120 kilograms per square centimeter.

The active silicic acids include fume silica, silica aerogels and silica zero gels, in which the silica particles are prevented from agglomeration during preparation from a silica gel by treatment of surfaces thereof to provide organo-(usually methyl)silyl groups thereon, as described in Tyler United States Patent No. 3,015,645. Such active silicic acids in the 25% by volume loading increase tensile strength of the natural rubber gum stock about 75 to 120 kilograms per square centimeter. This is contrasted with only 4 to 6 kilograms per square centimeter increase in the case of whiting, and 5 to 9 kilograms in the case of colloidal kaolin.

The above silicic acids have surface areas from 170 to 900, or even more, square meters per gram. The active aluminum silicates and alumina gels have surface areas of 110 to about 160 square meters per gram in general. This is in contrast to surface areas of less than 30 square meters per gram in the case of the entirely inert pigments and less than 90 square meters per gram in the case of semi-active (or semi-reinforcing) pigments or fillers.

All of the pigments which provide the reinforcing or strengthening action required in the present invention are further characterized by having a surface area of at least 90 square meters per gram, as determined by nitrogen absorption. Much superior reinforcing or strengthening of tensile and tear is obtained when the surface areas are much greater, and the preferred light-colored reinforcing pigments have surface areas greater than 100 square meters per gram, and some are obtainable with surface areas as great as 900 or more square meters per gram. There is apparently no upper limit on surface area as long as the pigment particles are greater than molecular size.

The character of the surface of the pigment has, however, something to do with reinforcing ability as well as surface area, as illustrated by the fact that fine precipitated calcium carbonate, like china clay, is only of limited value, even after a surface treatment. The surfaces of the filler particles may often advantageously be treated with an organosilane, such as vinyl-trichlorosilane, vinyltris-beta-methoxy-ethoxy silane, etc.

The "light-colored active filler substances" include pyrogenic and precipitated silicic acids also known as fume and precipitated silicas, precipitated calcium silicate, precipitated aluminum silicate, alumina gel, similar substances and mixtures of these. These substances have a strengthening (reinforcing) action on the rubber when used in suitable doses and when worked into the rubber through using shearing forces. For this reason they are also termed "light-colored strengthening filler substances."

The strengthening or reinforcing action is shown by the good rubber-technology characteristics of the vulcanizates, in particular the high values for tear strength. These light-colored active filler substances can either be used individually in a given case, or else mixed with one another. Depending upon the degree of strengthening desired, that is depending upon the requirements made of the rubber product, it is possible on occasion to add aditional so-called inactive or semiactive filler substances such as kaolin, siliceous chalk, chalk, surface-treated chalk, zinc oxide, magnesium oxide, and similar substances. The proportion of light-colored active filler substances can amount to 10% to 150%, by weight, based on the weight of rubber. However, the optimum strengthening effect is obtained with a 20% to 50% filler content with natural rubber and 30% to 90% filler content with synthetic rubber based on the weight of the rubber. It is possible to make use of smaller amounts, but the strengthening action then occurs only to a limited extent. In the event that highly-filled rubber articles are required, it is possible to increase substantially the proportion of filler substance in the disperse phase of the dispersion. It is also possible to use more than 150%, but in that event poorer processability and deterioration of certain rubber-technology characteristics of the produced articles have to be put up with. There can be added to the finished dispersions, produced in accordance with the invention, further filler substances, such as are for example used in the production of latex mixtures, such as chalk, heavy spar, clay, silicic acids or silicas of natural origin, and so forth; it is similarly possible to add thickening mediums and substances having a sensitizing action, such as polyglycol ether, silicofluoride, zinc salts, buffer substances, and so forth, for the purpose of adapting the dispersions of the invention to the particular purpose under consideration. It has been found that when the content of the aforesaid active filler substances in the dispersions of natural rubber is increased to more than the preferred upper limit, then no further increase of the strengthening effect above that obtained for the preferred upper limit is obtained, not even when the total quantity of filler substances consists of light-colored active filler substances. However, when the proportion of filler substances in excess of the preferred upper limit is not added in the form of light-colored active filler substances, but in the form of so-called semiactive filler substances or inactive filler substances, such for example as chalk, then there are obtained in a surprising way vulcanizates that have practically the same good rubber-technology characteristics as those vulcanizates in which the total content of filler substances, that is also including the portion in excess of 50%, consists exclusively of light-colored active filler substances. Because these semiactive or inactive filler substances are substantially cheaper than the light-colored active filler substances, it is in this way possible to produce highly-filled rubber dispersions, having excellent rubber-technology characteristics, in an economical way.

For the purpose of preparing the dispersions of the present invention, that contain light-colored active filler substances, there is required a combination of wetting medium with certain protective colloids, along with a further addition of substances having an alkaline action. Suitable wetting mediums are anion-active and non-ionogenic capillary-active substances (or surface-active agents), such for example as soaps made from natural or synthetic fatty acids, resin soaps, salts of amino carboxylic acids or acylated amino carboxylic acids, fatty alcohol sulfates, alkyl polyalcohol sulfates, sulfates of esterified or etherified polyhydroxy compounds, substituted polyglycol ethers or acylated or alkylized alkylol amines, sulfonates of fatty acids, their esters or amides, ---
[1] A small amount, 5 to 15%, of zinc oxide, a nonreinforcing pigment, is almost always used in rubber compounds to activate accelerators and is not to be considered.

primary and secondary alkyl sulfonates, as well as sulfonates of polycarboxylic acid esters, alkylbenzene sulfonates, fatty aromatic sulfonates, alkylnaphthalene sulfonates, alkylbenzimidazol sulfonates; esters and ethers of polyalcohols; polyalkyleneoxide derivatives, such for example as the conversion products of ethylene oxide and/or propylene oxide with fatty acids, fatty alcohols, alkylized phenols or amines. These substances can be added by themselves or mixed with one another. The use of potassium oleate, water-soluble resin soaps, polyalkyleneoxide derivatives, as well as fatty alcohol sulfates, alkylbenzol sulfonates containing 12 to 24 carbon atoms, and furthermore the dialkyl esters of sulfosuccinic acid, preferably with 2-ethylhexanol has been found to be particularly advantageous.

Use is made of 0.5% to 10%, and preferably 1% to 5% of the wetting medium, relative to the disperse phase, that is relative to the rubber mixture that is to be dispersed. It is of course also possible to use greater quantities of wetting mediums; however, the resistance to water of films produced from the dispersion, or coatings or other objects, then becomes diminished.

For the purpose of the invention, particularly suitable protective colloids have proved to be derivatives of polyacrylic acids that are soluble in water, or that can at least absorb or be swelled up in water, such for example as polyacrylamide or salts of the polyacrylic acids. Even in small quantities these substances effect excellent stabilization of the aqueous dispersions. The quantity of these protective colloids amounts to 0.5% to 10%, and preferably 1% to 3% for natural rubber mixtures and to 1% to 5% for mixtures of polymeric material consisting of a major amount of synthetic rubber or containing thermoplastic material.

A 10% aqueous solution of the polyacrylamide, which can be used in accordance with the present invention, when measured by the Höppler method at 25° C. displays a viscosity of 10,000 to 250,000 centipoises. Preference is given to those polyacrylamides whose 10% solution, under the same conditions, has a viscosity ranging from 50,000 to 100,000 centipoises. For the water-soluble salts of polyacrylic acids use is made of those whose 10% aqueous solution when measured by the Höppler method at 25° C. shows a viscosity of 200 to 270,000 centipoises, and preferably of 200 to 50,000 centipoises. These salts of polyacrylic acids contain as cations mainly those from the group of alkali metals and of the amines, such for example as lithium, sodium, potassium, ammonium and substituted ammonium ions.

It is also possible to use as protective colloids salts of the polymethyacrylic acids, and furthermore salts of the alginic acids, of the carboxymethyl celluloses or methyl celluloses. It is also possible to use caseinates as protective colloids. These substances must, however, be used in great quantities in order to obtain a stabilizing effect similar to that obtained with polyacrylic acid derivatives. Because an increased colloid content in the dispersion causes the rubber-technology values of the finished rubber articles to fall off, it is important, for the production of good final products, to keep the amount of protective colloids as low as possible.

As substances having an alkaline action, use is chiefly made of alkali hydroxides, ammonia, or amines such for example as morpholine, methyl amine, ethyl amine, propyl amine, butyl amines, cyclohexyl amine, diethylcyclohexyl amine, ethanol amines such for example as monoethanol amine, diethanol amine, triethanol amine, and so forth. The quantity used depends upon the type and the quantity of filler substance, and it normally amounts to 1% to 10%, and preferably 2% to 6%, relative to the disperse phase.

It is furthermore possible by the process of the invention to disperse such rubber mixtures as contain a portion of thermoplasts. Such mixtures of rubber and thermoplasts are being used to an increasing extent in technology and industry because of their special characteristics. Here too it has been found that useful articles, which have been made from the aforesaid mixtures of rubber and thermoplasts through dispersing in water, shaping, removing water and vulcanizing, have characteristics similar to those of useful articles made from the same mixture of constituents by direct vulcanization of the dry mixture, that is without dispersion in water.

The proportion of thermoplastic polymeric material which can be employed varies within wide limits depending upon the rubber polymers in the dispersion and upon the purpose under consideration. With synthetic rubber it is possible to produce dispersions that contain 90 parts by weight of rubber to 10 parts of thermoplastic material. It is also just as possible to produce dispersions that contain 10 parts by weight of synthetic rubber to 90 parts of thermoplastic material. When at least half of the rubber polymers are natural rubber, it is preferable that the thermoplastic material amount to no more than about 50% by weight relative to the mixture of all the polymers.

The most suitable thermoplastic are chiefly polyvinyl chloride, polyvinyl acetate, polyvinylidene chloride, copolymerizates of vinyl chloride and other polymerizable monomers, low-pressure and high-pressure polyethylenes, polypropylene, polystyrene, polyacrylic acid esters, polymethacrylic acid esters, polyamides and mixed polymerizates and mixtures of these.

For example, suitable mixtures of synuthetic rubber and thermoplasts are mixtures of butadiene-styrene rubber with polystyrene, nitrile rubber with styrene-acrylonitrile resins, polyisobutylene or butyl rubber with polyethylene or polypropylene, and so forth. Homogeneous mixtures of nitrile rubber and polyvinyl chloride are particularly characteristic examples of the strengthened mixtures of synthetic rubbers and thermoplasts that can be converted into aqueous dispersions in accordance with the present invention; the crosslinked products made by using aqueous dispersions of such mixtures resist ozone and resist solvents.

In mixtures containing thermoplasts it is preferable to have in the range of 30% to 70% by weight of light-colored active filler substances relative to the weight of the total polymers. The polymer mixtures to be dispersed in accordance with the present invention may moreover contain other usual added substances, such as vulcanization chemicals, mediums for protection against aging, mediums for protecting against light, mediums for protecting against ozone, softeners, distending mediums, coloring substances, pigments, disinfectng mediums, and so forth.

The efficiency of these auxiliary and additional substances, when they are added in accordance with the present invention to the practically water-free rubber mixture and dispersed in common with this in water, is better than when the same substances are worked into natural or synthetic latex in the same amount. This improvement of the efficacy of the auxiliary or added substances is due to the fact that with the process of the invention they become situated in the interior of the rubber particles of the aqueous dispersion, and there they are capable of developing all their efficacy. When on the other hand the auxiliary and added substance are added to natural or synthetic latex, they become distributed in the aqueous phase of the latex and are not capable of developing their entire efficacy inside the rubber particles of the latex.

Such added substances were for example described by J. van Alphen in "Rubber Chemicals," published by Elsevier Publishing Company (1956). In the following description some examples are given for each of the aforesaid classes of substances. Besides vulcanization mediums such as sulfur, it is possible to use as vulcanization chemicals tellurium, selenium, and activators such as zinc oxide, magnesium oxide, lead oxides, zinc carbonate, magnesium carbonate, zinc stearate, lead oleate and so forth; as accelerators, alone or mixed with one another, dithiocarbamates, for example sodium- or zinc diethyl-dithiocarbamate, zinc ethylphenyldithiocarbamate, zinc dibutyldithiocarbamate; heterocyclic compounds, for example 2-mercapto-benzothiazol or its zinc salt, di-2-benzothiazyldisulfide, 2-mercaptothiazoline, N-cyclohexyl-2-benzothiazolsulfenamide; thiuramsulfides, for example tetramethylthiuramono-, di- and tetrasulfide, tetraethylthiuramono-, di- and tetrasulfide, dipentamethylene-thiuramtetrasulfide; guanidine derivatives for example N,N'-diphenylguanidine, N,N'-di-o-tolylguanidine; xanthogenates for example sodium- or zinc isopropylxanthogenate; carbanilides and thiocarbanilides. It is moreover possible to make use of peroxides, such for example as dicumylhydroperoxide, di-tert.-butylperoxide and others, for crosslinking the rubber polymers.

As mediums for protecting against aging, against light, against ozone, the following are mentioned here by way of examples: waxy and paraffinic hydrocarbons; phenols and alkylized phenols, such as 4,4'-dihydroxydiphenyl, p-phenylphenol, beta-naphthol, resorcin resins, derivatives of aniline and substituted anilines, for example condensation products of aniline with acetaldehyde or butyraldehyde, alkylated diphenyl amine, N,N-diphenyl-p-phenylenediamine, N-phenyl-N'-cyclohexyl-p-phenylenediamine; naphthylamine derivatives, for example phenyl-alpha-napthylamine, phenyl-beta-napthylamine, di-beta-napthyl-p-phenylenediamine; phenol-aldehyde-amine condensation products; nickel dibutyldithiocarbamate, mercaptobenzimidazol and its zinc salts.

As softeners it is for example possible to work in aliphatic and aromatic hydrocarbons of a mineral-oil character, natural and synthetic resins or their compounds, tall oil (liquid resin) distillation products, waxes, sulfurized or chlorosulfurized oils, ester softeners, such for example as dibutyl phthalate, dioctyl phthalate, dioctyl adipate, dibenzyl sebacate, polymer softeners such as polypropylene adipate, phosphoric acid esters such as tricresyl phosphate, epoxy softeners, glycols, and so forth.

As distending mediums, chief use is made of such substances as during a heat treatment split off gases, such for example as diazoaminobenzene, azodicarbonamide, benzolsulfonic acid hydrazides, dinitrosopentamethylenetetramine, and so forth.

As pigments there can for example be added titanium dioxide, iron oxides, chromium oxides, cadmium sulfides, antimony sulfides, lithopone, and also organic pigments.

As disinfection medium there may be mentioned here p-oxybenzoic acid, its methyl esters and also benzyl esters, phenol derivates such as chlorinated phenols, ditertiary butyl-p-cresol, p-chlor-m-cresol, pentachlorophenol, and so forth.

The dispersions produced in accordance with the present application have a pH value that preferably lies between 8 and 10. They are very fine; at least 90% of the particles have a diameter of less than 1.5 micron; 10% have a diameter of up to 3 microns.

The viscosities of the dispersions depend on the initial substances and on the amount of water added. It is possible to make thick pasty dispersions, that can be diluted with water, without coagulation occurring. The dispersions of the invention are also stable under mechanical influences, shearing action, and temperature influences.

It has been found that the dispersions of the invention can be mivxed with electroneutral as well as with negatively charged particles contained in synthesized latexes, as well as with synthetically prepared dispersions of a different type. It is in this way possible to produce dispersion mixtures that have further valuable properties.

Synthetic latexes and synthetically produced dispersions that are suitable for mixing with the dispersions of the present invention are for example those that contain polychloroprene, butadiene-styrene mixed polymerizates, butadiene-acrylic-acid nitrile mixed polymerizates, polytetrafluorethylene, polymethacrylic acid esters, polyvinyl chloride, polyvinylidene chloride and its mixed polymerizates, polyvinylpyridine-butadiene mixed polymerizates, and so forth. Different dispersions of this invention can also be mixed as, for example, synthetic rubber based dispersions with other synthetic rubber based dispersions or with natural rubber based dispersions.

The dispersions of the invention can be usefully employed in many technical and industrial fields. They are chiefly used where the use of dispersions, as compared with the use of solid rubber mixtures, produces advantages in technical and industrial applications, and where the same characteristics are required for the finished products as in the case of processing practically water-free rubber mixtures. The dispersion of the invention can moreover be used advantageously in all cases in which latex does not meet the specified requirements.

The dispersions can be vulcanized before or after imparting shape. It is however also possible to omit vulcanization completely.

Unless otherwise stated the proportions of the rubber mixtures given in the following examples are by weight, relative to 100 parts of polymer. The quantities of wetting mediums, protective colloids and alkali are relative to 100 parts of the disperse phase; that is, relative to 100 parts of the polymer mixture that is to be dispersed.

Example 1

In a mixing rolling mill there are mixed together homogeneously at a rolling temperature of 60 to 80° C. the following substances:

| | Parts |
|---|---|
| Natural rubber | 100 |
| Precipitated silicic acid (Ultrasil VN$_3$®=registered trademark | 20–80 |
| Stearic acid | 2 |
| Triethanol amine | 3 |
| Active zinc oxide | 1 |
| Zinc diethyldithiocarbamate | 1 |
| Zinc mercaptobenzothiazol | 0.2 |

Into this mixture there are worked in at 60° C. in an internal mixer, in sequence:

| | Parts |
|---|---|
| Octadecenylpentaethylene glycol ether | 2 |
| Potassium hydroxide (solid) as a 40% aqueous solution | 2 |
| Polyacryl amide (dry) in the form of a 10% aqueous swelling (Cyanamer P 250®) | 1 |

Then, with continued mechanical working, water is slowly added in small portions until the phase reversal, and the dispersion is regulated to a dry content of 50%.

The dispersion obtained has the following characteristics:

pH—value 9 to 9.5
Particle size—90% up to 1.5 microns; 10% 1.5 to 3 microns
Viscosity $\eta_{22}$—2500 to 3000 cp., measured with a rotation viscosimeter at 20° C. and a shear gradient of 22 sec.$^{-1}$ Before the test films were produced, there was stirred thoroughly into the dispersion 1.5 parts of sulfur (solid), as a 50% sulfur suspension.

The dispersions produced in this way were diluted with 10% water, had the foam and the air removed, and 25 cc. of each dispersion was spread uniformly upon a 200 x 200 mm. glass plate, surrounded by a rim, and was dried in air for 24 hours. The film had a uniform thickness averaging 0.3 mm. It was then vulcanized for 20 minutes in hot air at 100° C.

For the purpose of making it possible to compare the vulcanizates produced from the aqueous dispersions with vulcanizates made from the same rubber mixture but without any dispersion in water, specimens were prepared from the corresponding practically waterfree rubber mixtures that contained 20% and 40% respectively of precipitated silicic acid, and they were heated in a vulcanizing press. The tear strength of these specimens was determined in accordane with DIN 53507 (DIN=German Industrial Standard); and their ultimate strength and ultimate elongation were determined in accordance with DIN 53504. The rubber-technology values obtained are listed in Table 1.

TABLE 1

| Precipitated silicic acid (parts by weight) | Ultimate elongation (percent) | Ultimate strength (kg./sq. cm.) | Tear strength (kg./cm.) | Notes |
|---|---|---|---|---|
| 20 | 800 | 160 | 31 | D, F |
| 20 | 840 | 165 | 22 | M, P |
| 40 | 730 | 225 | 34 | D, F |
| 40 | 750 | 218 | 34 | M, P |

In the Notes column: D=produced from the dispersion, F=heat uncovered, M=made from the dry rubber mixture, P=heated in a press.

The physical values of the vulcanized dispersion films, as a function of the filler content, are given in Table 2:

TABLE 2

| Precipitated silicic acid (parts by weight) | Ultimate elongation (percent) | Ultimate strength (kg./sq. cm.) | Tear strength (kg./cm.) | Notes |
|---|---|---|---|---|
| 20 | 800 | 160 | 31 | D, F |
| 30 | 750 | 210 | 38 | D, F |
| 40 | 730 | 225 | 34 | D, F |
| 50 | 670 | 200 | 30 | D, F |
| 60 | 670 | 187 | 33 | D, F |
| 70 | 650 | 170 | 31 | D, F |
| 80 | 600 | 150 | 34 | D, F |

Example 2

Dispersions were prepared whose composition corresponded to the dispersions with 40% of precipitated silicic acid of Example 1, but with a further addition of various quantities of the inactive filler chalk in the disperse phase. The rubber-technology values obtained under the same test conditions, as well as a comparative value for the vulcanizate obtained directly, without dispersion in water that is, from a dry rubber mixture containing 40 parts of precipitated silicic acid and 60 parts of chalk, for shaped vulcanizates heated in a vulcanizing press, are listed in the following Table 3:

TABLE 3

| Filler | | Ultimate elongation (percent) | Ultimate strength (kg./sq. cm.) | Tear strength (kg./cm.) | Notes |
|---|---|---|---|---|---|
| Precipitated ilicic acid parts) | Chalk (parts) | | | | |
| 40 | 20 | 617 | 182 | 37 | D, F |
| 40 | 40 | 653 | 156 | 34 | D, F |
| 40 | 60 | 620 | 130 | 34 | D, F |
| 40 | 60 | 640 | 148 | 26 | M, P |

Example 3

In a mixing rolling mill, at a rolling temperature of 60 to 80° C. there was produced the following mixtures:

| | Parts |
|---|---|
| Natural rubber | 100 |
| Pyrogenic silicic acid (Aerosil®) | 40 |
| Stearic acid | 2 |
| Triethanol amine | 3 |
| Paraffin-base medium for protection against light | 2 |

Into this mixture there was worked, in a suitable internal mixer at 60° C.:

| | Parts |
|---|---|
| Potassium oleate | 3 |
| Potassium hydroxide (solid) as a 40% aqueous solution | 2 |
| Ammonium polyacrylate (dry) as a 20% aqueous swelling (Rohagit S, low viscosity®) | 2 and 5 | to obtain a homogenous mixture. Then, with a continuance of the action of shearing forces, water was slowly added in small portions until the phase reversal, and the dispersion was adjusted with water until it had a solid content of 50%.

Before the production of the test films, there were added to the dispersions the following vulcanization chemicals, in the form of a 50% aqueous paste:

| | Parts |
|---|---|
| Zinc oxide | 1.0 |
| Zinc diethyldithiocarbamate | 1.0 |
| Zinc mercaptobenzothiazol | 0.2 |
| Sulfur | 1.5 |

The test films, made as in Example 1, were vulcanized for 20 minutes at 100° C. The rubber-technology values are listed in Table 4:

TABLE 4

| Ammonium polyacrylate (parts by weight) | Ultimate elongation (percent) | Ultimate strength (kg./sq. cm.) | Tear strength (kg./cm.) |
|---|---|---|---|
| 2 | 600 | 232 | 49 |
| 5 | 450 | 127 | 30 |

Table 4 shows that increasing the quantity of protective colloid from 2 to 4 parts, relatively to the disperse phase, leads to considerable impairment of the rubber-technology values. It is here important to keep the proportion of protective colloid as low as possible.

The grinding of the vulcanization chemicals was done in a balls-type mill, through grinding the substances in the given proportions, together with an equal part by weight of water, that contained 2% of a wetting medium. There can be used for the wetting medium various capillary-active substances; however polyalkylene oxide derivates or alkyl-naphthaline sulfonates are preferably used.

Example 4

A dispersion of the following composition is prepared as described in Example 1:

| | Parts |
|---|---|
| Natural rubber | 66.7 |
| Butadiene-styrol rubber (30% styrol) | 33.3 |
| Precipitated silicic acid (Mikrosil S®) | 25.0 |
| Precipitated aluminum silicate | 30.0 |
| Potassium salt of colophony | 1.0 |
| Alpha-(Na-sulfonyl)-bis-(ethylhexyl)-succinate (Rapidnetzer®) | 1.0 |
| Morpholine | 6.0 |
| Polyacrylamide (dry) as a 10% aqueous swelling (Cyanamer P 250®) | 1.0 |
| Active zinc oxide | 1.0 |
| Zinc diethyldithiocarbamate | 1.0 |
| Zinc mercaptobenzothiazol | 0.2 |
| Sulfur | 1.5 | and is adjusted with water to a dry content of 50%. The test films, vulcanized in hot air at 100° C. for 20 minutes, had the following rubber-technology values:

| | | |
|---|---|---|
| Ultimate elongation | percent | 520 |
| Ultimate strength | kg./sq. cm | 144 |
| Tear strength | kg./cm | 20 |

Example 5

| | Parts |
|---|---|
| Natural rubber | 90 |
| High-pressure polyethylene (Lupolen H®) | 10 | were mixed together homogeneously in a rolling mill at 120° C. Into this mixture there were worked homogeneously, at a rolling temperature of 60–80° C.:

|  | Parts |
|---|---|
| Precipitated silicic acid (Ultrasil VN$_3$®) | 35 |
| Triethanol amine | 3 |
| Stearic acid | 2 |
| Active zinc oxide | 1 |
| Zinc diethyldithiocarbamate | 1 |
| Zinc mercaptobenzothiazol | 0.2 | then, during the further action of shearing forces, there were added in a worm-type mixer:

|  | Parts |
|---|---|
| Nonylphenyldecaethyleneglycol ether | 2 |
| Potassium hydroxide (solid) as a 40% aqueous solution | 2 |
| Polyacryl amide (dry) as a 10% aqueous swelling (Cyanamer P 250®) | 1 |

The water was worked in in small portions, and the resultant dispersion was adjusted to a 50% content of solid substances.

Before the production of the test films, there was added to the dispersion 1.5 parts of sulfur (solid)

in the form of a 50% aqueous paste; and the test films, made as in Example 1, were vulcanized for 30 minutes at 100° C.

These test films gave the following rubber-technical values:

| | |
|---|---|
| Ultimate elongation _____ percent__ | 570 |
| Ultimate strength _____ kg./sq. cm__ | 180 |
| Tear strength _____ kg./cm__ | 48 |

Example 6

Into a homogeneous mixture consisting of:

|  | Parts |
|---|---|
| Natural rubber | 50 |
| and |  |
| Styrol resin (Butakon S 7001®) | 50 | there were distributed homogeneously at a rolling temperature of 60–80° C. the following substances:

|  | Parts |
|---|---|
| Precipitated silicic acid (Ultrasil VN$_3$®) | 30 |
| Stearic acid | 1 |
| Triethanol amine | 2 |
| Octadecenyl sulphuric acid ester (K salt) | 1 |
| Na-tetrapropylenebenzol sulfonate | 1 |
| Morpholine | 5 |
| Ammonium polyacrylate (solid) as a 20% aqueous swelling (low-viscosity Rohagit S®) | 5 |

Then, during further processing by shearing forces in a vanes-type internal mixer, water was slowly added in small portions until the phase reversal, and the dispersion was adjusted with water to a 50% content of solid substances.

Before the production of the test films, there were added to the dispersion, in the form of a 50% aqueous paste, the following vulcanization chemicals:

|  | Parts |
|---|---|
| Zinc diethyldithiocarbamate | 1 |
| Sulfur | 1 |
| Active zinc oxide | 1 |

The test films, which were vulcanized in hot air at 100° C. for 20 minutes, gave the following rubber-technical values:

| | |
|---|---|
| Ultimate elongation _____ percent__ | 330 |
| Ultimate strength _____ kg./sq. cm__ | 78.5 |

Example 7

There was prepared, as described in Example 6, a dispersion of the following composition:

|  | Parts |
|---|---|
| Natural rubber | 70 |
| Polyvinyl acetate (Vinnapas UW 10®) | 30 |
| Precipitated silicic acid (Ultrasil VN$_3$®) | 40 |
| Stearic acid | 1 |
| Triethanol amine | 2 |
| Salt of a naphthaline-sulfo-acid condensation product (Vultamol®) | 2 |
| Morpholine | 5 |
| Ammonium polyacrylate (dry) as a 20% aqueous swelling (Rohagit S, low-viscosity®) | 5 |

This was adjusted with water to a dry content of 50%.

Before the production of the test films, there were added to the dispersion, in the form of a 50% aqueous paste, the following vulcanization chemicals:

|  | Parts |
|---|---|
| Zinc diethyldithiocarbamate | 1.4 |
| Sulfur | 1.4 |
| Red Seal zinc oxide | 1.4 |

The test films, which were vulcanized in hot air at 100° C. for 20 minutes, had the following rubber-technical values:

| | |
|---|---|
| Ultimate elongation _____ percent__ | 350 |
| Ultimate strength _____ kg./sq. cm__ | 60 |

Example 8

In a mixing rolling mill there are mixed together homogeneously at a rolling temperature of 60 to 100° C. the following substances:

|  | Parts |
|---|---|
| Butadiene-styrol mixed polymerizate 30% styrol) | 100 |
| Precipitated silicic acid (Ultrasil VN 3®) (®=registered trademark) | 50–90 |
| Stearic acid | 2 |
| Extra-light magnesium oxide (Maglite D®) | 7 |
| Zinc diethyldithiocarbamate | 1.5 |
| Zinc salt of mercaptobenzothiazol | 0.3 |
| Active zinc oxide | 5 |

Into this mixture there are worked homogeneously at 60° C. in an internal mixer:

|  | Parts |
|---|---|
| Oleylhexaethyleneglycol ether | 2 |
| Potassium hydroxide (solid) as a 40% aqueous solution | 3 |
| Polyacrylamide (dry) in the form of a 10% aqueous swelling (Cyanamer P 250®) | 1.5 |

Then, with continued mechanical working, water is slowly added in small portions until the phase reversal, and the dispersion is adjusted to a dry content of 50%.

The dispersions obtained had the following characteristics:

pH value: 9 to 9.5
Particle size: 90% up to 1.5 microns; 10% 1.5 to 3 microns
Viscosity $\eta_{22}$: 2500 to 3000 cp., measured with a rotation viscosimeter at 20° C. and a shear gradient of 22 sec.$^1$ Before the test films were produced there was stirred thoroughly into the dispersion:

1.5 parts of sulfur (solid) as a 50% sulfur suspension.

The dispersions produced in this way were diluted with 10% water, had the foam and air removed, and 25 cc. of of each dispersion was spread uniformly upon a 200 x 200 mm. glass plate, surrounded by a rim, and was dried in air for 24 hours. The films had a uniform thickness averaging 0.3 mm. They were then vulcanized for 20 minutes in hot air at 100° C.

For the purpose of making it possible to compare the vulcanizates produced from the aqueous dispersions with vulcanizates made from the same rubber mixture but without any dispersion in water, specimens were prepared from the corresponding practically waterfree rubber mixtures that contained 90 parts of precipitated silicic acid, and they were heated in a vulcanizing press. The ultimate strength and the ultimate elongation of the specimens were determined in accordance with DIN 53504 (DIN= German Industrial Standard), and the tear strength was determined in accordance with DIN 53507. The rubber-technology values obtained are listed in Table 5.

TABLE 5

| Precipitated silicic acid (parts by weight) | Ultimate elongation (percent) | Ultimate strength (kg./sq. cm.) | Tear strength (kg./cm.) | Notes |
|---|---|---|---|---|
| 0 | 240 | 24 | 0.8 | L, F |
| Butadiene-styrol synthetic latex: | | | | |
| 50 | 620 | 40 | 4.0 | D, F |
| 60 | 480 | 58 | 4.0 | D, F |
| 80 | 500 | 84 | 28.2 | D, F |
| 90 | 500 | 98 | 33.8 | D, F |
| 90 | 470 | 101 | 35 | M, P |

In the Notes column: L=latex, D=produced from the dispersion, F=heated uncovered, M=made from the dry rubber mixture, P=heated in a press.

Instead of the precipitated silicic acid which was used, it is also possible to use for the filler substance, for example: 80 parts of precipitated calcium silicate, precipitated aluminum silicate or alumina gel; or a mixture of 30 parts of pyrogenic silicic acid and 45 parts of alumina gel; or 30 parts of precipitated silicic acid and 45 parts of kaolin. Perfect dispersions that process well are likewise obtained.

Example 9

There were mixed together homogeneously in a mixing rolling mill at 60 to 100° C. the following substances:

| | Parts |
|---|---|
| Nitrile rubber (30% acrylnitrile) | 100 |
| Precipitated silicic acid (Mikrosil S®) | 30 |
| Dioctylphthalate | 30 |
| Stearic acid | 1.5 |
| Triethanol amine | 1.0 |

Into this mixture there were worked in homogeneously and in succession, in a worm-type kneader, the following substances:

| | Parts |
|---|---|
| Amine salt of tetrapropylenebenzolsulfo acid (Marlon M®) | 2 |
| Morpholine | 5 |
| Ammonium polyacrylate (dry) as a 20% aqueous swelling (Rohagit S®, low-viscosity) | 3 |

Then, with continuance of the action of shearing forces, water was slowly added in small portions, and the dispersion was adjusted to a dry content of 40%.

Before the production of the test films, there were added to the dispersions the following vulcanization chemicals, in the form of a 50% aqueous paste:

| | Parts |
|---|---|
| Zinc diethyldithiocarbamate | 2 |
| Active zinc oxide | 2 |
| Sulfur | 2 |

The films, heated for 20 minutes at 150° C., in their rubber-technology testing gave the following values:

| | |
|---|---|
| Ultimate elongation ____percent__ | 480 |
| Ultimate strength ____kg./sq. cm__ | 73 |
| Tear strength ____kg./cm__ | 5.3 |

The grinding down of the vulcanization chemicals was done by milling the substances for 48 hours, in the given proportions, together with the same amount by weight of water, that contained 2% of wetting medium, the grinding being done in a balls-type mill. It is possible to make use of greatly varying capillary-active substances for the wetting medium. However use is preferably made of polyalkylene oxide derivatives, or of alkylnaphthaline sulfonates.

Example 10

There was prepared, under the same conditions as for Example 9, a dispersion of the following composition:

| | Parts |
|---|---|
| Butadiene-styrol mixed polymerizate (30% styrol) | 51 |
| Natural rubber | 49 |
| Precipitated silicic acid (Siflox N®) | 75 |
| Stearic acid | 2 |
| Extra light magnesium oxide (Maglite D®) | 7 |
| Zinc diethyldithiocarbamate | 1.5 |
| Zinc salt of mercaptobenzothiazol | 0.3 |
| Active zinc oxide | 5 |
| Sulfur | 3 |
| Potassium oleate | 3 |
| Morpholine | 5 |
| Ammonium polyacrylate (dry) as a 20% aqueous swelling (Rohagit S®) low viscosity | 3 |
| Sodium alginate | 1.0 |

This mixture was adjusted with water to a dry content of 50%.

The films, which had been heated for 20 minutes at 100° C. gave the following rubber-technology values:

| | |
|---|---|
| Ultimate elongation ____percent__ | 450 |
| Ultimate strength ____kg./sq. cm__ | 100 |
| Tear strength ____kg./cm__ | 31.7 |

Example 11

A 40% aqueous polychloroprene dispersion was prepared, as described in Example 9, having the following composition:

| | Parts |
|---|---|
| Polychloroprene (Neoprene WB®) | 100 |
| Precipitated silicic acid (Ultrasil VN3®) | 30 |
| Precipitated aluminum silicate (Silteg AS7®) | 10 |
| Active zinc oxide | 10 |
| 2-mercaptoimidazoline | 0.5 |
| Nonylphenyldecaethylene glycol ether | 4 |
| Morpholine | 5 |
| Triethanol amine | 1.0 |
| Ammonium polyacrylate (dry) as a 10% aqueous swelling (Rohagit S®) low viscosity | 4 |

The test films, heated for 20 minutes at 150° C., had the following rubber-technology values:

| | |
|---|---|
| Ultimate elongation ____percent__ | 270 |
| Ultimate strength ____kg./sq. cm__ | 70 |
| Tear strength ____kg./cm__ | 10 |

Example 12

There was prepared, as described in Example 9, a dispersion of the following composition:

| | Parts |
|---|---|
| Butyl rubber (97% isobutylene) | 100 |
| Precipitated silicic acid (Ultrasil VN3®) | 30 |
| Polypropylene adipate | 20 |
| Titanium dioxide | 5 |
| Stearic acid | 2 |
| Octadecenyl sulfuric acid ester (Na salt) | 2 |
| Morpholine | 4 |
| Ammonium polyacrylate (dry) as a 20% aqueous swelling (Rohagit S®) low-viscosity | 3 |
| Zinc diethyldithiocarbamate | 1.5 |
| Tetramethylthiuramdisulfide | 1.5 |
| Sulfur | 2 |
| Active zinc oxide | 5 |
| Triethanol amine | 2 |

This mixture was adjusted with water to a 50% content of solids.

The films, which had been heated for 20 minutes at 160° C., had the following rubber-technology values:

Ultimate elongation _____percent__ 850
Ultimate strength _____kg./sq. cm__ 100
Tear strength _____kg./cm__ 18

Example 13

There was prepared, as described in Example 9, a dispersion of the following composition:

| | Parts |
|---|---|
| Nitrile rubber (30% acryl nitrile) | 40 |
| Oil-extended butadiene-styrol rubber (Buna 372®) | 60 |
| Pyrogenic silicic acid (Aerosil®) | 40 |
| Precipitated aluminum silicate (Silteg AS7®) | 5 |
| Stearic acid | 2 |
| Potassium salt of colophony | 2 |
| Triethanol amine | 1.0 |
| Morpholine | 5 |
| Ammonium polyacrylate (dry) as a 10% aqueous swelling (Rohagit S®) medium-viscosity | 4 |
| Zinc diethyldithiocarbamate | 2 |
| Active zinc oxide | 2 |
| Sulfur | 2 |

This mixture was adjusted with water to a dry content of 50%.

The test films, which had been heated for 20 minutes at 150° C., had the following rubber technology values:

Ultimate elongation _____percent__ 440
Ultimate strength _____kg./sq. cm__ 73
Tear strength _____kg./cm__ 20

Example 14

There was prepared, as described in Example 1, a dispersion of the following composition:

| | Parts |
|---|---|
| Butadiene-styrol rubber (24% styrol) | 40 |
| Chlorsulfonized polyethylene (Hypalon 20®) | 60 |
| Precipitated silicic acid (Ultrasil VN3®) | 40 |
| Precipitated aluminum silicate (Silteg AS7®) | 5 |
| Triethanol amine | 2 |
| Octadecenylpentaethylene glycol ether | 2 |
| Morpholine | 5 |
| Polyacryl amid (dry) as a 10% aqueous swelling (Cyanamer P250®) | 4 |

There were added as vulcanization chemicals:

| | Parts |
|---|---|
| Zinc oxide | 2 |
| Zinc diethyldithiocarbamate | 2 |
| Sulfur | 2 | relatively to 100 parts of butadiene-stryrol mixed polymerizate, and

| | Parts |
|---|---|
| Lead oxide | 25 |
| Dipentamethylenethiuramtetrasulfide | 1.5 |
| Tetramethylthiuramdisulfide | 0.5 |
| Mercaptobenzothiazyldisulfide | 0.2 | relatively to 100 parts of chlorsulfonated polyethylene.

The rubber-technology testing of the films, which had been heated for 20 minutes at 150° C., gave the following values:

Ultimate elongation _____percent__ 500
Ultimate strength _____kg./sq. cm__ 85
Tear strength _____kg./cm__ 14

Example 15

Under the conditions given in Example 1, there was prepared a disperson of the following composition:

| | Parts |
|---|---|
| Chlorsulfonized polyethylene (Hypalon 20®) | 51 |
| Natural rubber | 49 |
| Precipitated silicic acid (Utrasil VN3®) | 30 |
| Titanium dioxide | 20 |
| Magnesium oxide (Maglite D®) | 10 |
| Active zinc oxide | 10 |
| Hydrated colophony | 1.25 |
| Stearic acid | 1.0 |
| Paraffin-base medium for protection against light | 1.0 |
| Mercaptobenzothiazyldisulfide | 1.25 |
| Tetramethylthiurammonosulfide | 0.2 |
| Sulfur | 0.75 |
| Alpha (Na - sulfonyl) - bis(ethyl-hexyl)-succinate (Rapidnetzer®) | 2.0 |
| Triethanol amine | 1.0 |
| Potassium hydroxide (solid) as a 40% aqueous solution | 2.0 |
| Polyacryl amide (dry) as a 10% aqueous swelling (Cyanamer P 250®) | 5.0 |

This mixture was adjusted with water to a solid content of 50%.

The films, which had been vulcanized for 30 minutes at 150° C., had the following rubber-technology values:

Ultimate strength _____kg./sq. cm__ 125
Ultimate elongation _____percent__ 530
Tear strength _____kg./cm__ 16

Example 16

There was prepared, as described in Example 1, a dispersion of the following composition:

| | Parts |
|---|---|
| 1,4-cis-polyisoprene (Cariflex polyisoprene 300®) | 100 |
| Precipitated silicic acid (Ultrasil VN3®) | 40 |
| Stearic acid | 2 |
| Triethanol amine | 3 |
| Paraffin-base medium for protection against light | 1 |
| Zinc diethyldithiocarbamate | 2 |
| Active zinc oxide | 2 |
| Sulfur | 2 |
| Salt of a naphthalinesulfo acid condensation product (Vultamol®) | 2 |
| Potassium hydroxide (solid) as a 40% aqueous solution | 5 |
| Polyacryl amide (dry) as a 10% aqueous swelling (Cyanamer P 250®) | 1.5 | which was adjusted with water to a solid content of 50%.

The films, which were vulcanized for 30 minutes in hot air at 100° C., had the following rubber-technology values:

Ultimate elongation _____percent__ 800
Ultimate strength _____kg./sq. cm__ 130
Tear strength _____kg./cm__ 19

In addition to the rubber-technology values given in the foregoing, there is the important fact that 1,4 cis polymerizates of dienes, and also the mixed polymerizates of ethylene and propylene, which are produced by block polymerization or solvent polymerization with complete exclusion of water, can by the process of the present invention be converted into dispersions containing light-colored active filler substances. Thus, it is for the first possible to produce strengthened vulcanizates from these polymers by the usual methods of latex technology.

Example 17

| | Parts |
|---|---|
| Nitrile rubber (30% acryl nitrile) | 60 |
| and | |
| Polyvinyl chloride (K value 55) | 40 | are homogenized in a mixing rolling mill at 150 to 160° C., whereby the polyvinyl chloride coagulates.

Into this mixture there are worked in at 60° C. in the rolling mill:

| | Parts |
|---|---|
| Precipitated silicic acid (Ultrasil VN3®) (®=registered trademark) | 35 |
| Titanium white | 5 |
| Precipitated aluminum silicate | 3 |
| Dioctylphthalate | 0 and 30 |
| Stearic acid | 1.0 |

The homogeneous mixture obtained is processed further in an internal mixer at 70 to 80° C., under the action of shearing forces, and while adding:

| | Parts |
|---|---|
| Octadecenylpentaethylene glycol ether | 2 |
| Morpholine | 5 |
| Triethanol amine | 1.0 |
| Ammonium polyacrylate (dry) as a 20% aqueous swelling (Rohagit S®) low-viscosity | 3 |

Then water is added slowly and in small portions until the phase reversal; after which the solid content is adjusted to 40% with water.

The dispersion has the following characteristics:

Particle size: 95% up to 1.5 microns; 5% 1.5 to 3 microns.

pH value: 8.8

Viscosity $\eta_{22}$: 2200 cp., measured with a rotation viscosimeter and a shear gradient of 22 sec.$^{-1}$ at 20° C.

To the finished dispersion the following vulcanization chemicals are added in the form of an aqueous paste:

| | Parts |
|---|---|
| Active zinc oxide | 2 |
| Zinc diethyldithiocarbamate | 2 |
| Sulfur | 2 |

The grinding down of the vulcanization chemicals was done by milling the substances for 48 hours, in the given proportions, together with the same amount by weight of water, that contained 2% of wetting medium, the grinding being done in a balls-type mill. It is possible to make use of greatly varying capillary-active substances for the wetting medium. However use is preferably made of polyalkylene oxide derivates, or of alkylnaphthaline sulfonates.

For the purpose of determining the physical values, films were produced from the aqueous dispersions, in that the dispersions were diluted with 10% of water, had the foam and air removed, and 25 cc. of each dispersion was spread uniformly on a horizontal 200 x 200 mm. glass plate, surrounded by a rim, and was dried for 24 hours in air. The films had a uniform thickness averaging 0.25 mm. They were then vulcanized in hot air for 20 minutes at 150° C.

For the purpose of making it possible to compare the vulcanizates produced from the aqueous dispersions with vulcanizates made from the same polymeric mixture but without any dispersion in water, specimens were prepared from the corresponding practically waterfree polymeric mixtures that contained 30 parts of softener(s), and they were heated in a vulcanizing press. The ultimate strength and the ultimate elongation of the specimens were determined in accordane with DIN 53504 [DIN= German Industrial Standard] and the tear strength was determined in accordance with DIN 53507. The rubber-technology values obtained are listed in Table 6. Table 6 also contains comparative values for vulcanizates produced from dispersions, in which, with the composition otherwise remaining the same, the ratio of nitrile rubber to polyvinyl chloride was varied.

TABLE 6

| Nitrile rubber, weight parts | Polyvinyl chloride, weight parts | Softener, weight parts | Precipitated silicic acid, weight parts | Ultimate elongation, percent | Ultimate strength, kg./sq. cm. | Tear strength, kg./cm. | Notes |
|---|---|---|---|---|---|---|---|
| 60 | 40 | 0 | 35 | 330 | 130 | 13 | D, F |
| 60 | 40 | 30 | 35 | 600 | 108 | 20 | D, F |
| 60 | 40 | 30 | 35 | 405 | 113 | 14 | M, P |
| 80 | 20 | 30 | 35 | 650 | 70 | 16 | D, F |
| 40 | 60 | 30 | 35 | 450 | 60 | 8 | D, F |

D=made from the dispersion, F=heated in the open, M=made from the dry rubber mixture, P=heated in a press, L=latex.

The films made from the dispersions are before their crosslinking heat-sealable. After their crosslinking they are they are scratch-resistant, weather-resistant and ozone-resistant; they resist chemical cleaning and also boiling water.

For purposes of comparison a mixture was prepared from nitrile rubber latex, polyvinyl chloride latex, softener(s) and a suspension of filler substance. The whole mixture, in its percentual composition, corresponded to that of the above-described dispersion with 60 parts of nitrile rubber, 40 parts of polyvinyl chloride and 30 parts of softener. The films produced from this latex mixture were nonhomogeneous, had a very bad surface composition, and low resistance to solvents. The rubber-technology characteristics of these films, which were likewise vulcanized for 20 minutes at 150° C., are compared in Table 7 with those of the dispersion of the invention.

TABLE 7

| Nitrile rubber, weight parts | Polyvinyl chloride, weight parts | Softener, weight parts | Precipitated silicic acid, weight parts | Ultimate elongation, percent | Ultimate strength, kg./sq. cm. | Tear strength, kg./cm. | Notes |
|---|---|---|---|---|---|---|---|
| 60 | 40 | 30 | 35 | 90 | 30 | 5 | L, F |
| 60 | 40 | 30 | 35 | 600 | 108 | 20 | D, F |

L=Latex, F=heated in open, D=made from dispersion.

Example 18

Under the testing conditions described in Example 17, there was produced a dispersion of the following composition:

| | Parts |
|---|---|
| Nitrile rubber (Butakon A 3802®) | 70 |
| Polymethylmethacrylate (Polygum 7 N®) | 30 |
| Tricresyl phosphat | 30 |
| Precipitated silicic acid (Ultrasil VN 3®) | 40 |
| Red Seal zinc oxide | 4 |
| Titanium dioxide | 5 |
| Zinc diethyldithiocarbamate | 2 |
| Sulfur | 2 |
| Sodium tetrapropylbenzol sulfonate | 2 |
| Triethanol amine | 1.0 |
| Ammonium polyacrylate (dry) as a 20% aqueous swelling (Rohagit S®, low-viscosity) | 3 |
| Morpholine | 5 |

This was adjusted with water to a 50% dry content.

The test films made from this dispersion were vulcanized in hot air for 20 minutes at 150° C. They had the following rubber-technology values:

| | |
|---|---|
| Ultimate elongation percent | 500 |
| Ultimate strength kg./sq./cm. | 74 |
| Tear strength kg./cm. | 27 |

Example 19

There was produced, under the conditions described in Example 17, a dispersion of the following composition:

| | Parts |
|---|---|
| Nitrile rubber (acryl nitrile content 30%) | 60 |
| Polyvinyl chloride (K value 55) | 30 |
| Styrene resin (Butakon S 7001®) | 10 |
| Dibutyl phthalate | 25 |
| Precipitated silicic acid (Siflox N®) | 35 |
| Titanium dioxide | 5 |
| Zinc oxide | 4 |
| Zinc diethyldithiocarbamate | 2 |
| Sulfur | 2 |
| Nonylphenyldecaethylene glycol ether | 2 |
| Triethanol amine | 1.0 |
| Morpholine | 5 |
| Ammonium polyacrylate (dry) as a 20% aqueous swelling (Rohagit S®, low-viscosity) | 3 | which was adjusted with water to a dry content of 50%.

After 20 minutes vlucanization in hot air at 150° C., testing showed:

| | |
|---|---|
| Ultimate elongation__percent | 350 |
| Ultimate strength__kg./sq./cm | 89 |
| Tear strength__kg./cm | 10 |

Example 20

There was produced, as described in Example 17, a 50% aqueous dispersion of the following composition:

| | Parts |
|---|---|
| Chlorsulfonized polyethylene (Hypalon 20®) | 100 |
| Polyamide resin from di- and trimerized unsaturated fatty acids and polyamides (Versamid 100®) | 20 |
| Precipitated silicic acid (Ultrasil VN 3®) | 40 |
| Triethanol amine | 1.0 |
| Salt of a naphthaline sulfonic acid condensation product (Vultamol®) | 3.0 |
| Morpholine | 6.0 |
| Polyacrylamide (dry) as a 10% aqueous swelling (Cyanamer P 250®) | 5.0 |

The finished dispersion, prior to the production of the test films, had added to it the following vulcanization chemicals in the form of an aqueous grinding:

| | Parts |
|---|---|
| Lead oxide | 25 |
| Dipentamethylenethiuramtetrasulfide | 1.5 |
| Tetramethylthiuramdisulvide | 0.5 |
| Mercaptobenzothiazyldisulfide | 0.2 |

The films were heated for 20 minutes at 150° C. When tested they gave the following values:

| | |
|---|---|
| Ultimate elongation__percent | 500 |
| Ultimate strength__kg./sq./cm | 87 |
| Tear strength__kg./cm | 16 |

Example 21

There was produced, under the conditions described in Example 17, a 40% aqueous dispersion of the following composition:

| | Parts |
|---|---|
| Nitrile rubber (Perbunan N 2810®) | 30 |
| Butadiene-styrol rubber (Buna 152®) | 30 |
| Polyvinyl chloride (Solvic 122®) | 40 |
| Precipitated silicic acid (Ultrasil VN 3®) | 35 |
| Precipitated aluminum silicate (Silteg AS 7®) | 5 |
| Dioctyl phthalate | 10 |
| Active zinc oxide | 2 |
| Zinc diethyldithiocarbamate | 2 |
| Sulfur | 2 |
| Nonylphenyldecaethylene glycol ether | 2 |
| Triethanol amine | 1.0 |
| Morpholine | 5 |
| Ammonium polyacrylate (dry) as a 10% aqueous swelling (Rohagit S®, medium-viscosity) | 5 |

The films, which were vulcanized for 20 minutes at 150° C., had the following rubber-technology values:

| | |
|---|---|
| Ultimate elongation__percent | 210 |
| Ultimate strength__kg./sq./cm | 103 |

The films obtained resist ozone, solvents, and repeated washing by boiling.

Example 22

There was produced, as described in Example 17, a perfect dispersion from the following constituents:

| | Parts |
|---|---|
| Butadiene-styrol rubber (24% styrol) | 70 |
| Natural rubber | 20 |
| High-pressure polyethylene (Lupolen H®) | 10 |
| Alumina gel | 30 |
| Precipitated silicic acid (Ultrasil VN 3®) | 40 |
| Active zinc oxide | 5 |
| Zinc diethyldithiocarbamate | 1.5 |
| Sulfur | 2 |
| Potassium oleate | 3 |
| Triethanol amine | 3 |
| Potassium hydroxide (solid) as a 40% aqueous solution | 3 |
| Ammonium polyacrylate (dry) as a 20% aqueous swelling (Rohagit S®, low-viscosity) | 5 | which was adjusted with water to a 50% content of solid substances.

The test films, vulcanized for 20 minutes at 100° C., had the following rubber-technology characteristics, which are compared in the table with those of pure butadiene-styrol latex:

| | Ultimate elongation, percent | Ultimate strength, kg./sq. cm. | Tear strength kg./cm, |
|---|---|---|---|
| Butadiene-styrol latex | 240 | 24 | 0.8 |
| Dispersion of Example 22 | 350 | 70 | 10 |

Example 23

There was prepared under the conditions given in Example 17, a 50% aqueous dispersion of the following composition:

| | Parts |
|---|---|
| Polychloroprene (Neoprene WB®) | 60 |
| Polyvinylacetate (Vinnepas UW 10®) | 40 |
| Precipitated silicic acid (Siflox N®) | 30 |
| Kaolin | 20 |
| Oleyldecaethylene glycol ether | 1 |
| Potassium salt of colophony | 2 |
| Morpholine | 5 |
| Ammonium polyacrylate (dry) as a 20% aqueous swelling (Rohagit S®, low-viscosity) | 5 | which was adjusted with water to a 50% content of solids.

Before the production of the test films there were added to the dispersion relatively to 100 parts of polychloroprene, in the form of a 50% aqueous paste:

| | Parts |
|---|---|
| Zinc oxide | 8 |
| 2-mercaptoimidazoline | 0.5 |

The films, which were vulcanized for 20 minutes at 160° C., had the following rubber-technology values:

| | |
|---|---|
| Ultimate elongation__percent | 100 |
| Ultimate strength__kg./sq. cm | 50 |

We have been successful in preparing commercially usable aqueous dispersions of reinforced natural and synthetic rubber compounds, i.e. aqueous dispersions of compounds comprising natural and synthetic rubbers reinforced with the above-mentioned synthetic active, light-colored fillers or pigments, only when we have masticated therein a water-soluble to water-swellable polymer having a long, substantially linear, substantially hydrocarbon chain with depending carboxyl groups or preferably salts or amides thereof, as present in water-soluble to water-swellable polymers of acrylamide, water-swellable polymers of acrylic acid, and water-swellable alkali metal (including ammonium) salts of polymers of acrylic acid and mixtures of such. The preferred protective colloids are the linear polymers having a depending carboxyl group or an alkali metal (including ammonium) salt or amide thereof for each 1.25 to 2.5 carbon atoms (not counting carbon in the solubilizing group) in the hydrocarbon chain.

The above polymeric protective colloids are polymers of monomers which are graft-polymerizable onto rubbers when they are masticated therewith in the absence of oxygen. The water-swellable polymers must swell in water to at least 300% of their dry volume at mixing temperatures. When methyl cellulose, sodium or ammonium caseinate, sodium alginate, glue, gelatine, etc., as usually used for preparing aqueous dispersions of reclaimed rubber and nonreinforced high polymers, is substituted for the above generally linear water-soluble or highly water-swellable high polymers, unless such large amounts are used as destroys the product for its intended purpose, a spongy mass is produced, first on the gradual addition of water, then upon further gradual addition of water the mass merely separates or stratifies into two phases, i.e. water and the rubbery polymer. When very large amounts of the usually used protective colloids are incorporated an oil-in-water type diseprsion can be obtained. However, the dispersion has no appreciable shelf-life and coagulates and stratifies in a few hours and at the latest in one day. Moreover, the technical characteristics of vulcanizate obtained from such dispersions are bad, being limited by the great amount of the protective colloid required. Thus, the vulcanizates are not water-stable and when used with water the surface becomes white and the vulcanizate can become re-emulsified.

Although we do not wish to be held to a definite theory as to the mechanism of the action of the water-swellable linear polymers, we believe that, during mastication of these long-chain high polymers with the rubber in the compound, some of the long-chain molecules of both the rubber and polymer are ruptured, forming free radicals, which in some cases combine so as to provide graphs of part of the soluble or highly swellable high polymer onto the rubber chains. Such graphs being chemically combined cannot separate from the strongly reinforced rubber and go bodily into the water phase as can glue, gelatine, etc. The grafted portions cause the water to remain in the strongly reinforced polymer until the quantity is such that the inversion of phases takes place.

The presence of volatile solvent is undesirable in the compositions of the present invention, both because of the adverse effect of such solvent on the polymer and because of the marked tendency for formation of bubbles or blisters in the coagulum during drying and curing thereof when substantial amounts of solvent are present. Small amounts of volatile solvent may, however, be present while still obtaining the major benefits. The dispersions should be substantially solvent free, that is, the amount of solvent present should be insufficient to cause formation of bubbles or blisters upon drying and curing the coagulum.

The reinforced latices (or aqueous dispersions) of the present invention are adapted to produce usable articles, such as reinforced rubber tubing, surface coatings, etc. directly from the latex by coagulation of latex solids in the desired shape and drying of the thus produced coagulum. Tackifying agents as used in adhesives to provide a tacky surface are therefore undesirable in the compositions of the present invention. Such agents when present in substantial amounts not only render the surface of the shaped and dried coagulum tacky and undesirable for its intended purposes, but also usually adversely affect physical properties. Small amounts of one or more tackifying agents may, however, be present in the composition without appreciably modifying or tackifying the surface of the dried coagulum. It is apparent that one can, therefore, still obtain major benefits of the invention even though there is present amounts of such tackifying agents that are ineffective for production of a tacky surface.

As used herein, the term "substantially free of tackifying agents" shall permit the inclusion only of such amounts of tackifying agents as are ineffective in rendering the surface of the dried and cured coagulum tacky to the touch.

It also is apparent that in accordance with the provisions of the patent statutes modifications of the invention may be made without changing the spirit thereof.

In the appended claims, the term "polymer" is used in a generic sense to include copolymers. Thus, "polymer of a conjugated diene" includes copolymers of one or more such dienes with one or more mono-olefinic compounds copolymerizable therewith.

What is claimed is:

1. A process for the production of aqueous rubber dispersions, which are substantially free of easily volatilized solvent and which are suitable for forming articles having nontacky rubbery portions of higher tear strength by direct deposition, drying and curing thereof, said process comprising subjecting to shearing forces a homogeneous mixture comprising a continuous phase of (a) at least one rubbery polymer of a conjugated diene of 4 to 6, inclusive, carbon atoms, (b) from about 10% to about 150% by weight of synthetic light-colored reinforcing filler selected from the group consisting of silicas, aluminum silicate, calcium silicate, alumina gels, and mixtures thereof, which filler has a surface area of at least 90 square meters per gram, percentages being based on the weight of the total of said rubbery polymer present, (c) from about 0.5% to about 10% total by weight of at least one wetting agent selected from the group consisting of anionic and nonionic surface-active agents based on the weight of the dry mixture, (d) from about 1% to about 10% total by weight, based on the weight of the dry mixture, of at least one substance having an alkaline action selected from the group consisting of alkali metal hydroxides, ammonia and amines, and (e) from about 0.5% to about 10% by weight, based on the weight of the dry mixture, of a high polymer of a monomer which graft polymerizes onto rubber when masticated therein, which is swellable to at least 300% in water at the mixing temperature, and which is a member of the group consisting of polymers of acrylic acids, salts and amides thereof, any water being present as a discontinuous phase, and simultaneously adding water to said mixture while substantially free of volatile solvents and tackifying agents until phase inversion occurs and a dispersion of the oil-in-water type is formed.

2. The process of claim 1 wherein said water-swellable high polymer has at least one member of the group consisting of carboxyl groups, salts and amides thereof for each 2.5 carbon atoms of the hydrocarbon backbone thereof, carbon atoms in groups which are depending from said backbone not being counted.

3. The process of claim 1 wherein the mixture contains at least one thermoplastic polymer of a vinylidine monomer selected from the group consisting of ethylene, propylene, vinyl chloride, vinyl acetate, vinylidene chloride, acrylonitrile, styrene and acrylic and methacrylic esters in total amounts up to nine times the weight of the rubbery polymer.

4. The process of claim 1 wherein the mixture contains a vulcanization agent and where the reinforcing agent comprises silica.

5. The process of claim 3 wherein the rubbery polymer comprises a mixture of natural rubber and synthetic rubbery polymer of a major proportion of a conjugated diene of 4 to 6, inclusive, carbon atoms.

6. A homogeneous aqueous dispersion which is suitable for forming nontacky, bubble-free, rubbery portions of shaped articles directly upon deposition, drying and curing thereof, said dispersion comprising a disperse phase which is substantially free of volatile solvents and substantially free of tackifier therefor, and which contains (a) at least one rubbery polymer of a conjugated diene of 4 to 6 carbon atoms, and (b) from about 10% to about 150% by weight, based on the total weight of the rubbery polymer, of synthetic light-colored active reinforcing filler which is dispersed in the polymer, which is selected from the group consisting of silicas, aluminum silicate, calcium silicate, alumina gels, and mixtures thereof, which filler has a surface area of at least 90 square meters per gram, percentages being based on the weight of rubber polymer present (c) from about 0.5% to about 10% by weight, based on the weight of the dry mixture, of wetting agent selected from the group consisting of anionic and nonionic surface-active agents, (d) from about 1% to about 10% by weight, based on the weight of the dry mixture of substances having an alkaline action, selected from the group consisting of alkali metal hydroxides, ammonia and amines, and (e) from about 0.5% to about 10% by weight based on the weight of the dry mixture of a high polymer swellable in water to at least 300% and which is a member of the group consisting of polymers of acrylic acids, salts and amides thereof.

7. The dispersion of claim 6 wherein the said disperse phase also contains a thermoplastic polymer of a vinylidene monomer selected from the group consisting of ethylene, propylene, vinyl chloride, vinyl acetate, vinylidene chloride, acrylonitrile styrene, and acrylic and methacrylic esters, in total amounts up to nine times the weight of the total of said rubbery polymer present.

8. The dispersion of claim 6 containing a vulcanization agent.

9. The dispersion of claim 6 wherein the rubbery polymer comprises a mixture of natural and synthetic rubbery polymers of a conjugated diene of 4 to 6 carbon atoms.

10. The dispersion of claim 7 wherein the rubbery polymer is a butadiene acrylonitrile copolymer and the thermoplastic polymer is polyvinyl chloride.

11. The process of claim 3 wherein the total weight of rubbery polymer is at least as great as the total weight of thermoplastic polymer present.

12. The process of claim 1 wherein the said high polymer which is swellable in water is a polymer of an acrylamide, which polymer is further characterized in that a 10% aqueous solution thereof has a viscosity at 25° C., of 10,000 to 250,000 centipoises.

13. The process of claim 1 wherein the said high polymer, which is swellable in water, is a polymer of a salt of an acrylic acid, which polymer is further characterized in that a 10% aqueous solution thereof has a viscosity of 200 to 270,000 centipoises at 25° C.

14. The product of claim 6 wherein the high polymer swellable in water to at least 300% is a polymer of an acrylamide, which polymer is further characterized in that a 10% aqueous solution thereof at 25° C. has a viscosity of 10,000 to 250,000 centipoises.

15. The product of claim 6 wherein the polymer which is swellable in water to at least 300% is a polymer of an acrylic acid salt, which polymer is further characterized in that a 10% aqueous solution thereof at 25° C. has a viscosity of 200 to 270,000 centipoises.

References Cited

UNITED STATES PATENTS

| | | | |
|---|---|---|---|
| 2,330,353 | 9/1943 | Henderson | 260—42 |
| 2,880,184 | 3/1959 | Groves et al. | 260—3 |
| 2,914,498 | 11/1959 | Quarles et al. | 260—29.6 |
| 3,103,858 | 9/1963 | Lauren | 94—22 |

MURRAY TILLMAN, *Primary Examiner.*

M. J. TULLY, *Assistant Examiner.*

U.S. Cl. X.R.

260—5, 8, 17, 23.7, 33.6, 29.7, 41.5, 45.9, 45.95, 879, 887, 889, 890, 891, 892